United States Patent
Kim et al.

(10) Patent No.: US 9,239,847 B2
(45) Date of Patent: Jan. 19, 2016

(54) METHOD AND APPARATUS FOR MANAGING IMAGE FILES

(75) Inventors: Sin-ae Kim, Suwon-si (KR); In-sik Myung, Incheon (KR); Seung-eok Choi, Suwon-si (KR); Nam-wook Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 266 days.

(21) Appl. No.: 12/720,780

(22) Filed: Mar. 10, 2010

(65) Prior Publication Data
US 2010/0235336 A1    Sep. 16, 2010

(30) Foreign Application Priority Data

Mar. 12, 2009  (KR) .................. 10-2009-0021226
Jan. 6, 2010    (KR) .................. 10-2010-0000976

(51) Int. Cl.
*G06F 17/30* (2006.01)

(52) U.S. Cl.
CPC ...... *G06F 17/30247* (2013.01); *G06F 17/3028* (2013.01)

(58) Field of Classification Search
CPC .......... G06F 17/3028; G06F 17/30244; G06F 17/30247; G06F 17/30253; G06F 17/212; G06F 17/30793; G06F 3/0482; H04N 2201/3249; H04N 5/2621; H04N 5/272; H04N 1/00411; H04N 21/41407; H04N 2201/3225; H04N 1/32128; H04N 1/3872; H04N 2201/3277; G06K 9/00221; G06K 9/46; G06T 11/60; Y10S 707/915

USPC .......... 707/705, 736; 715/200, 838; 382/282, 382/284, 181, 173; 348/586; 345/634
See application file for complete search history.

(56) References Cited

U.S. PATENT DOCUMENTS

| | | | |
|---|---|---|---|
| 5,715,416 A * | 2/1998 | Baker | 715/839 |
| 6,621,524 B1 * | 9/2003 | Iijima et al. | 348/584 |
| 6,903,773 B1 * | 6/2005 | Fushimoto | 348/333.02 |
| 7,352,393 B2 * | 4/2008 | Sakamoto | 348/239 |
| 7,519,200 B2 * | 4/2009 | Gokturk et al. | 382/118 |
| 7,843,511 B2 * | 11/2010 | Kang et al. | 348/584 |
| 7,996,362 B2 * | 8/2011 | Shimada | 707/626 |
| 2001/0004258 A1 * | 6/2001 | Yokouchi | 345/418 |
| 2003/0210808 A1 * | 11/2003 | Chen et al. | 382/118 |
| 2004/0186820 A1 * | 9/2004 | Izume et al. | 707/1 |
| 2005/0071744 A1 * | 3/2005 | Dunbar et al. | 715/500.1 |
| 2006/0072808 A1 * | 4/2006 | Grimm et al. | 382/151 |
| 2006/0074992 A1 | 4/2006 | Kim et al. | |
| 2006/0077266 A1 * | 4/2006 | Nurmi | 348/239 |
| 2006/0251339 A1 * | 11/2006 | Gokturk et al. | 382/305 |
| 2007/0065040 A1 * | 3/2007 | Ming | 382/284 |
| 2007/0183679 A1 * | 8/2007 | Moroto et al. | 382/254 |

(Continued)

FOREIGN PATENT DOCUMENTS

| | | |
|---|---|---|
| JP | 2005-057360 | 3/2005 |
| JP | 2007-104326 | 4/2007 |
| KR | 10-2003-0012970 | 2/2003 |

(Continued)

*Primary Examiner* — Dennis Truong
(74) *Attorney, Agent, or Firm* — NSIP Law

(57) ABSTRACT

A method and apparatus for effectively managing image files are provided. The apparatus acquires a second image if a link information input signal is input. If a person is recognized from the second image, text information corresponding to the recognized person may be added to link information of a first image. Also, an image of the second image may be added to the link information of the first image.

13 Claims, 9 Drawing Sheets

(56) References Cited

U.S. PATENT DOCUMENTS

| | | |
|---|---|---|
| 2007/0239683 A1* | 10/2007 | Gallagher .......................... 707/3 |
| 2008/0205772 A1* | 8/2008 | Blose et al. ................... 382/225 |
| 2009/0002744 A1* | 1/2009 | Shimada ...................... 358/1.15 |
| 2009/0003799 A1* | 1/2009 | Inoha et al. ..................... 386/95 |
| 2009/0007018 A1* | 1/2009 | Ikeda et al. ................... 715/838 |
| 2009/0175609 A1* | 7/2009 | Tan ................................. 396/77 |
| 2009/0292678 A1* | 11/2009 | Kawanishi ........................ 707/3 |
| 2010/0235336 A1* | 9/2010 | Kim et al. ..................... 707/705 |

FOREIGN PATENT DOCUMENTS

| | | |
|---|---|---|
| KR | 10-2005-0005413 | 1/2005 |
| KR | 10-2005-0084818 | 8/2005 |
| KR | 10-2006-0026924 | 3/2006 |
| KR | 10-2006-0029539 | 4/2006 |
| KR | 10-2007-0089337 | 8/2007 |
| KR | 10-2007-0094055 | 9/2007 |
| WO | WO 2004/049708 | 6/2004 |
| WO | WO 2004/059966 | 7/2004 |
| WO | WO 2007/094537 | 8/2007 |

* cited by examiner

FIG.2

| PICTURE FILE IDENTIFICATION NO. | PICTURE (IMAGE) | LINK INFORMATION |
|---|---|---|
| 1 | PICTURE #1 | ADDRESS OF PICTURE #2, TEXT OF PICTURE #3 |
| 2 | PICTURE #2 | ADDRESS OF PICTURE #1, TEXT OF PICTURE #3 |
| 3 | PICTURE #3 | ADDRESS OF PICTURE #1, ADDRESS OF PICTURE #2, TEXT OF IMAGE #3 |
| ... | ... | ... |

METHOD AND APPARATUS FOR MANAGING IMAGE FILES

CROSS REFERENCE TO RELATED APPLICATIONS

This application claims the benefit under 35 U.S.C. §119(a) of Korean Patent Application No. 10-2009-0021226, filed on Mar. 12, 2009, and Korean Patent Application No. 10-2010-000976, filed on Jan. 6, 2010, the entire disclosures of which are both incorporated herein by reference for all purposes.

BACKGROUND

1. Field

The following description relates to a digital imaging system, and more particularly, to a method and apparatus for managing image files.

2. Description of the Related Art

As terminals equipped with cameras become increasingly popular, the terminals are frequently used to take and store images. However, because the images are normally stored in order of time with file names randomly assigned by the terminal, a user needs to manually search through numerous image files for a desired image. Further, if many image files are stored in the terminal or it has been long since the image files were stored, it may be difficult to retrieve a desired image file and/or to find out information about a desired image.

SUMMARY

In one general aspect, there is provided an image file managing apparatus, comprising an imager for taking an image, a display for displaying the image, a user interface for receiving a user input, a storage for storing the image, and a controller for acquiring a second image in response to receiving a link information input signal for a first image from the user interface, and adding at least one of the second image and information about the second image to the link information of the first image.

The controller may control the display to display a link information zone that indicates that the link information of the first image may be input, and may determine a user input signal for selecting the link information zone as the link information input signal.

The controller may control the imager to take the second image.

The controller may acquire the second image from image files stored in the storage.

If a character is recognized within the second image by performing a character recognition process on the second image, the controller may convert the recognized character into text information and add the text information to the link information of the first image.

The information about the second image may comprise at least one of a compressed file of the second image file and a storage address of the second image.

When a stored image file is displayed, and the stored image includes link information about the stored image, the display may display the stored image and the link information.

If the link information of the stored image is an image, the display may display a thumbnail of the image, and if the link information of the stored image is text information, the display may display the text information.

In another aspect, there is provided a method for managing an image file, the method comprising receiving a link information input signal for a first image, acquiring a second image, and adding at least one of the second image and information about the second image to link information of the first image.

The method may further comprise displaying a link information zone to indicate that the link information of the first image may be input, wherein a user input signal for selecting the link information zone is determined as the link information input signal.

The acquiring the second image may comprise switching to an imaging mode to acquire the second image.

The acquiring the second image may comprise acquiring the second image from stored image files.

The method may further comprise displaying a stored image, wherein if the stored image includes link information of the stored image, the stored image and the link information of the stored image may be displayed.

In another aspect, there is provided an image file managing apparatus comprising a storage storing a plurality of images and link information indicating linkage between the plurality of images, a controller using the link information to retrieve a first one of the images and at least one of a second image linked to the first image and information about the second image, when a user input signal for retrieving the first image is received, and a display displaying the first image and at least one of the second image and the information about the second image.

The link information may comprise at least one of an image linked to the first image, and information about the linked image.

In response to a user input signal requesting linkage of the first image to the second image, the controller may acquire the second image and link the first image to the second image by adding at least one of the second image and information about the second image to link information of the first image and adding at least one of the first image and information about the first image to link information of the second image.

The information about the linked image may comprise at least one of a compressed file of the image, a storage address of the image, and text extracted from the image.

If a plurality of images are linked to the first image, the controller may control the display to display a thumbnail of the second image, and an indicator for receiving a request to display the remaining images of the plurality of images.

In another aspect, there is provided a method for managing an image file, the method comprising storing a plurality of images and link information indicating linkage between the plurality of images, using the link information to retrieve a first one of the images and at least one of a second image linked to the first image and information about the second image, when a user input signal for retrieving the first image is received, and displaying the first image and at least one of the second image and the information about the second image.

The method may further comprise, in response to a user input signal requesting linkage of the first image to the second image, acquiring the second image, and linking the first image to the second image by adding at least one of the second image and information about the second image to link information of the first image and adding at least one of the first image and information about the first image to link information of the second image.

Other features and aspects may be apparent from the following description, the drawings, and the claims.

BRIEF DESCRIPTION OF THE DRAWINGS

FIG. 2 is a diagram illustrating an example in which images are stored.

Throughout the drawings and the description, unless otherwise described, the same drawing reference numerals are understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and structures may be omitted for increased clarity and conciseness.

Figure 1:
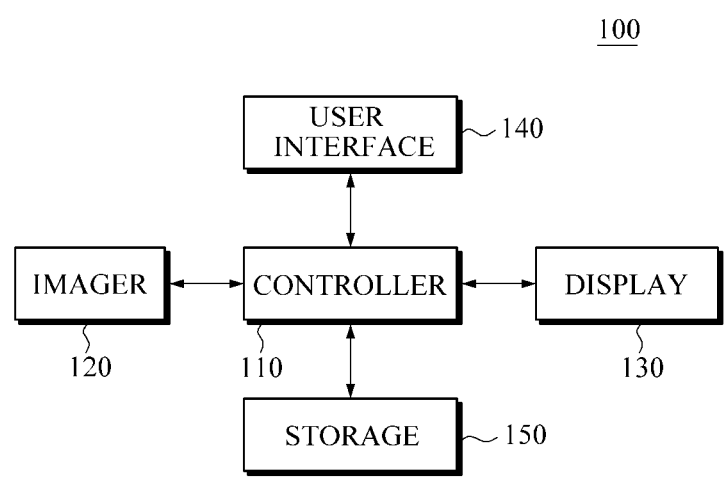
FIG. 1 is a diagram illustrating an example of an image file managing apparatus.

FIG. 1 illustrates an example of an image file managing apparatus.

The example image file managing apparatus 100 includes a controller 110, an imager 120, a display 130, a user interface 140, and a storage 150. The image file managing apparatus 100 may be a terminal equipped with a camera, such as a digital camera, a mobile phone, a PDA, an MP3 player, and the like. Also, the file managing apparatus 100 may be a computer that may be connected to a camera, or other imaging device, through a network, a cable, and the like. For example, the image file managing apparatus 100 may be included in a computer, and the computer may be connected to a mobile terminal via a cable. The mobile terminal may send images to the computer through the cable. The controller 110 controls the imager 120, the display 130, the user interface 140, and the storage 150, to control general operations of the image file managing apparatus 100. The controller 110 may include an image processor to process an image acquired by the imager 120. For example, the image processor may perform image processing based on computer algorithms to perform image processing on digital images.

The imager 120 may include an image sensor, for example, a charge-coupled device (CCD), a complimentary metal-oxide-semiconductor (CMOS), and the like. The imager 120 may also include an analog-to-digital converter. The imager 120 acquires an image signal from a captured image, converts it to a digital signal and transmits the digital signal to the controller 110. The controller 110 performs image processing, such as noise elimination or color processing, on the digital signal. The processed image may be stored in the storage 150.

The display 130 includes a display device, for example, a liquid crystal display (LCD), a light emitting diode (LED), an organic LED (OLED), and the like. Under the control of the controller 110, the display 130 may display an image of a subject captured by the imager 120 in an imaging standby mode, and read and display an image stored in the storage 150 in a playback mode.

The user interface 140 may include a variety of function keys, such as an imaging button for capturing and displaying an image, a camera operating mode button, an imaging mode selection button, a zoom button, and the like. The controller 110 may receive a user input signal from the user interface 140 and perform an operation based on the user input signal.

The storage 150 stores images taken, and data and applications for operating the image file managing apparatus 100, for example, an application for executing a character recognition algorithm to extract text from an image.

The controller 110 may manage images stored in the storage 150. The controller 110 may generate link information indicating the linkage between the images to manage the images.

The link information may be various types of data which may be added to an image file. The link information may include at least one of an image linked to each of the images and information about the linked image. The link information may be in, for example, an exchangeable image file format (exif), but is not limited thereto. The information about the linked image may include, for example, address information of linked image file, a compressed image of the linked file, and the like.

Upon receipt of a user input signal to retrieve a first image from storage 150, the controller 110 may retrieve the first image from storage 15. The controller 110 may also use the link information to retrieve at least one second image linked to the first image and information about the second image.

After receiving a link information input signal from the user interface 140, the controller 110 may acquire the second image and add the second image and information about the second image to the link information corresponding to the first image. For example, the controller 110 may add at least one of a compressed image of the second image (or a compressed file of the second image), a storage address of the second image, a file name of the second image, and the like, to the link information of the first image. The controller 110 may perform a first operation of adding at least one of the second image and the information about the second image to link information of the first image. The controller 110 may perform a second operation of adding at least one of the first image and the information about the first image to link information of the second image. The first and second operations may be performed in parallel or in sequence.

That is, the first and second images may be linked to each other according to the user input signal to request linkage of the second image to the first image. Accordingly, the user may retrieve the first image while retrieving the second image and the information about the second image, or may retrieve the second image while retrieving the first image and the information about the first image. Therefore, the linked first and second images may be managed simultaneously such as files located in the same folder on a computer.

A method of acquiring a second image will now be described. To acquire the second image, the controller 110 may control the imager 120 to capture the second image in the imaging mode. For example, if the controller 110 recognizes a person within the second image by performing a character recognition process on the second image, the controller 110 may convert the recognized person to text information and add the text information to the link information of the first image. Alternatively, one of image files stored in the storage 150 may be acquired as the second image. Similarly, when a second image file stored in the storage 150 is selected, the controller 110 may perform a character recognition process on the second image, convert the recognized person to text information, and add the text information to the link information of the first image.

The controller 110 may control the display 130 to display a link information zone indicating that the link information about the first image may be input. Furthermore, the controller 110 may determine a user input signal for selecting the link information zone as the link information input signal. Accordingly, a user may be notified that the link information may be input, and may easily input the link information.

If a stored image file includes link information, the display 130 may display the image file as well as the link information in the playback mode, under the control of the controller 110.

The display 130 may display an image and link information, which are retrieved as a first image file is retrieved in the controller 110, for example, a second image. The display 130 may also display the information about the second image, which are linked to the retrieved first image. If the link information indicates an image, the display 130 may display a thumbnail of the image. If the link information indicates text information, it may display the text information. If a plurality of second images are linked to the first image, the controller 110 may control the display 130 to display a thumbnail of one of the second images and an indicator for receiving a request to display the remaining plurality of second images.

Although a user does not input text in a terminal equipped with a camera or a text input unit is not incorporated in a terminal equipped with a camera, desired link information may be incorporated in an image file when the user takes an image. Furthermore, by adding a image file with a characteristic image associated therewith to the link information, the image file may be displayed together with the characteristic image. Accordingly, it is possible to automatically provide information associated with the image file.

For example, a photographer may take an image in an art gallery of a work of art as well as text information thereof, such as a title or a description of the work of art. A tourist may take images of attractions together with text information, such as signs, direction boards, signboards, and the like. By extracting text information from an image and adding it as link information, it is possible to automatically find information about the image from the link information.

FIG. 2 illustrates an example in which images are stored.

An image file may include image file identification information, image information, and link information. In FIG. 2, # No. indicates identification information of an image file.

Referring to FIG. 1 and FIG. 2, link information of Picture #1 includes a storage address of Picture #2 and text extracted from Picture #3. For example, if a user inputs a user input signal to request the image file managing apparatus 100 retrieve Picture #1, the image file managing apparatus 100 may display Picture #1 as well as Picture #2 read from the storage address of Picture #2 and text information extracted from Picture #3.

Link information of Picture #2 may include a storage address of Picture #1 and text extracted from Picture #3. For example, if a user inputs a user input signal to request the image file managing apparatus 100 retrieve Picture #2, the image file managing apparatus 100 may display Picture #2 as well as Picture #1 read from the storage address of Picture #1 and text information extracted from Picture #3.

Link information of Picture #3 may include a storage address of Picture #1, a storage address of Picture #2, and text information extracted from Picture #3. For example, if a user inputs a user input signal to request the image file managing apparatus 100 to retrieve Picture #3, the image file managing apparatus 100 may display Picture #3 as well as Picture #1 read from the storage address of Picture #1, Picture #2 read from the storage address of Picture #2, and the text information extracted from Picture #3.

Examples of user interface displays for managing image files are described with reference to FIGS. 3 through 6. In the examples shown in FIGS. 3 through 6, the image file managing apparatus 100 is a mobile terminal 200 including a camera.

Figure 3:
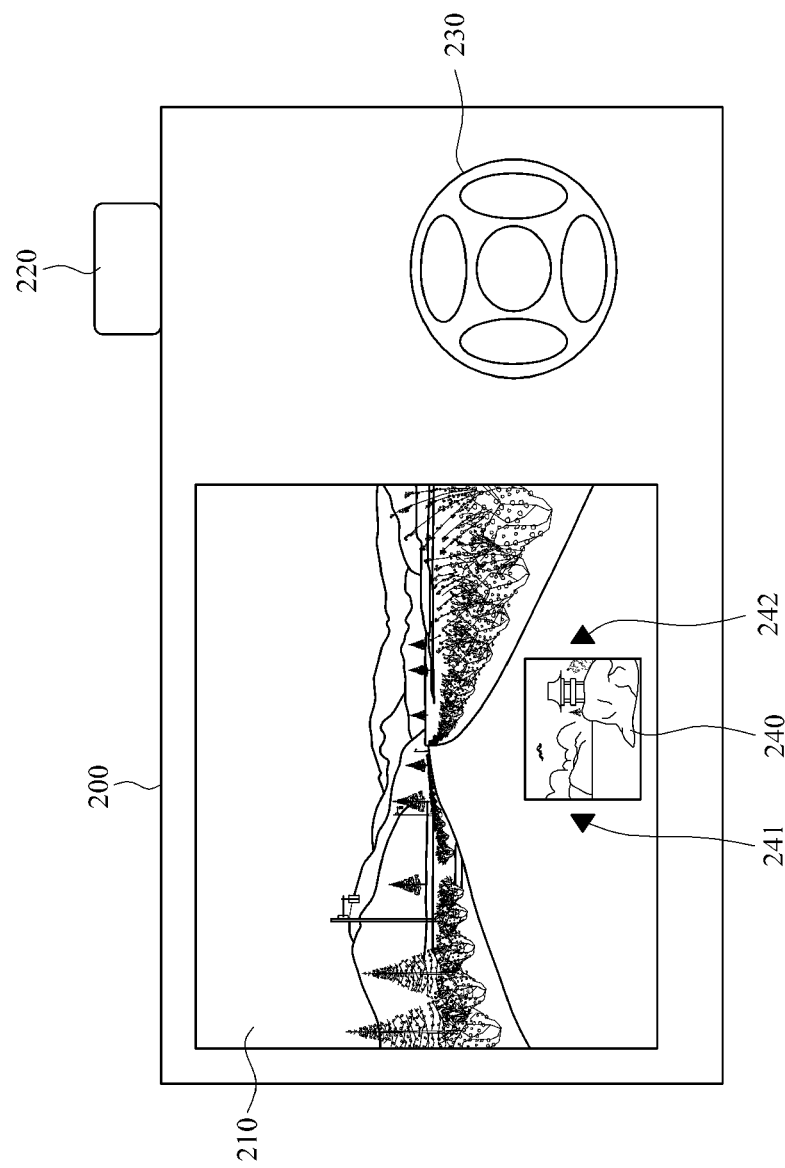
FIG. 3 is a diagram illustrating an example of an image file managing apparatus including a display of link information.

FIG. 3 illustrates an example of an image file managing apparatus including a display of link information.

FIG. 3 illustrates a display 210 of the first image which is displayed in playback mode of the camera 200. When the first image is displayed on the display 210, the link information of the first image may be displayed in a link information zone 240. As shown in FIG. 3, if the link information of the first image indicates an image, a thumbnail of the image may be displayed on the link information zone 240. If a plurality of images are linked to the first image, indicators 241 and 242 may be provided on one or both sides of the link information zone 240 to display the other images and information about the other images. At a user's request, the other images may be displayed.

In this example, button 230 is a direction key which is to be operated as a function and mode selection key. A user may select the indicators 241 and 242 using the button 230 to sequentially retrieve the images not shown on the link information zone 240 which are linked to the first image. While one link information zone 240 is shown in the example of FIG. 3, a plurality of link information zones may be provided and the link information may be displayed differently.

Figure 4:
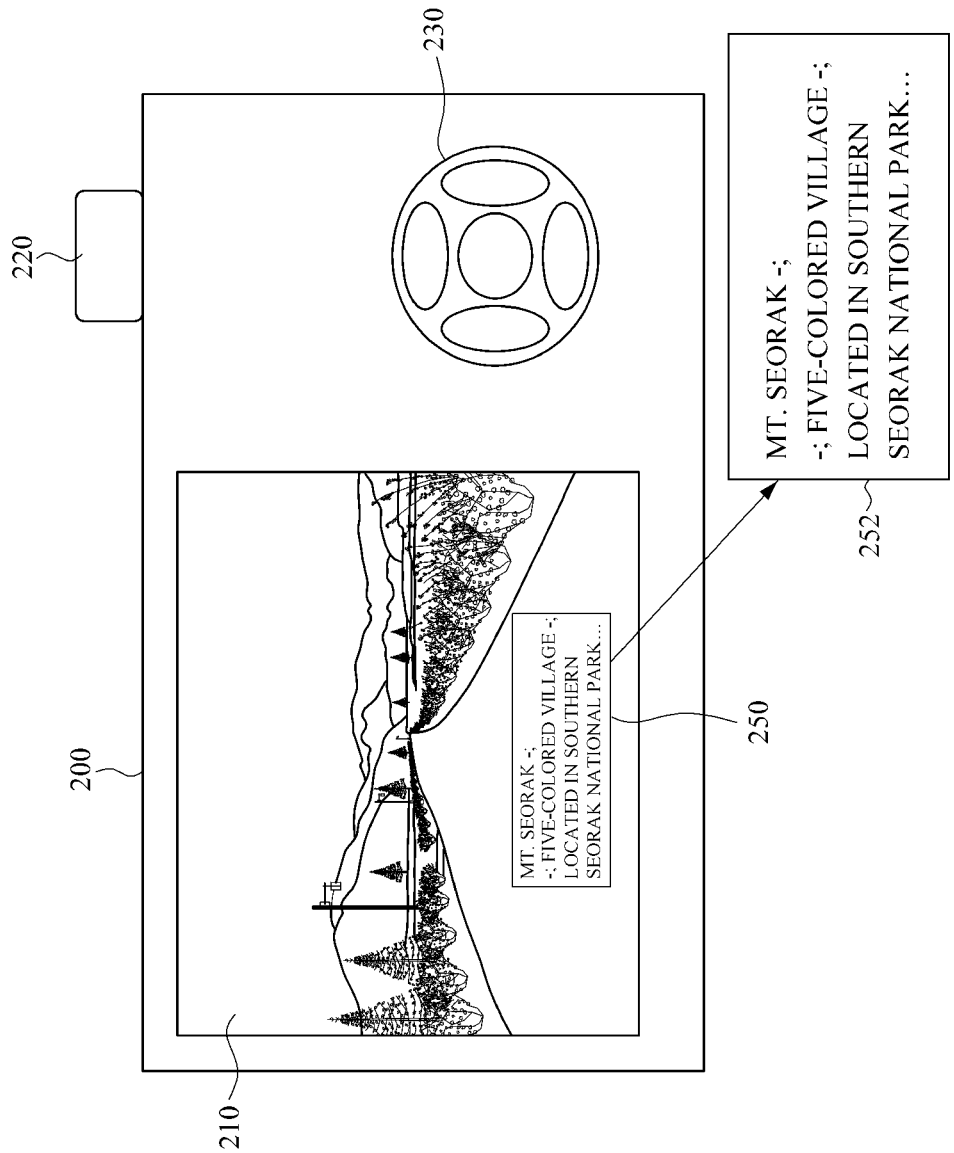
FIG. 4 is a diagram illustrating another example of an image file managing apparatus including a display of link information.

FIG. 4 illustrates another example of an image file managing apparatus including a display of link information.

If the link information of the first image is text information extracted from the second image, the text information may be displayed in the link information zone 250. In this example, block 252 indicates an enlarged link information zone.

In the example of an image file with link information, both a first image and link information of the first image, such as information about a Five-Colored Village of Mt. Seorak, may be displayed in the link information zone, as shown in the example of FIG. 4.

Accordingly, the user may input the link information of the first image by attaching the information about the second image, instead of additionally inputting information such as geographical or characteristic information of the first image. Further, the user may easily locate the information about the first image when displaying the image.

Figure 5:
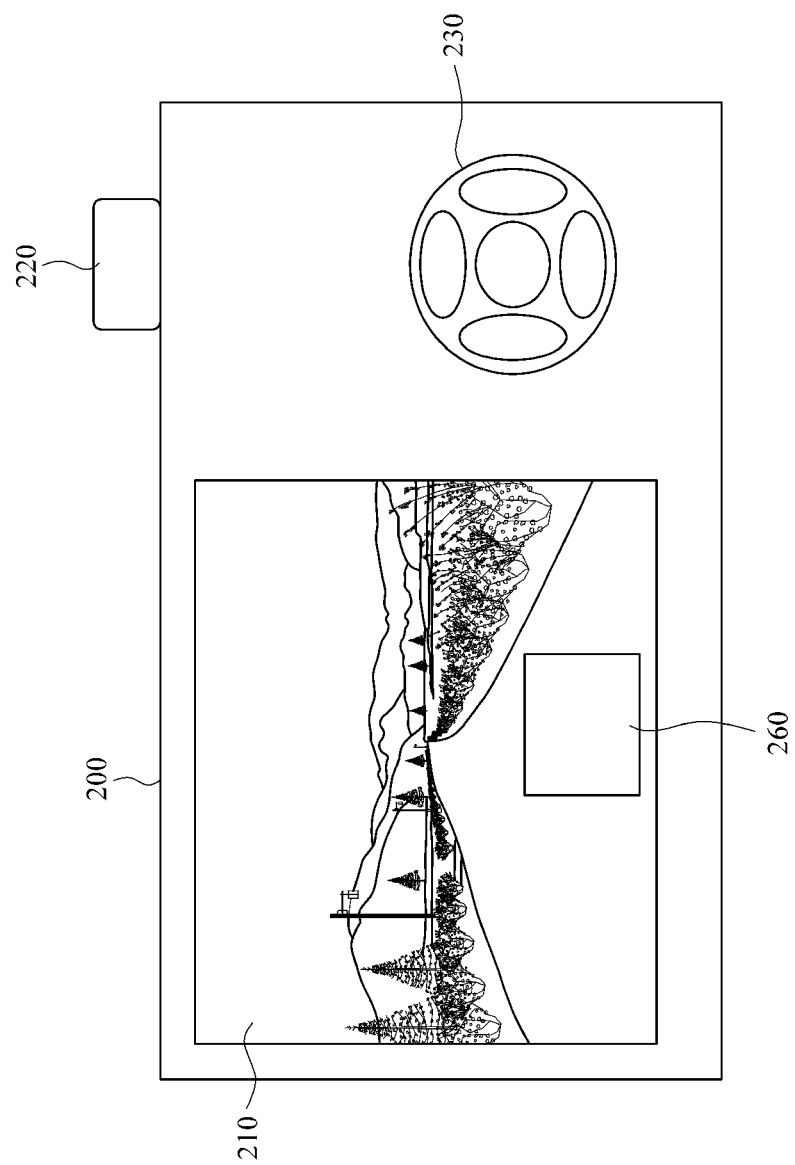
FIG. 5 is a diagram illustrating an example of inputting link information in the image file managing apparatus.

FIG. 5 illustrates an example of inputting link information in the image file managing apparatus.

In this example, a user pushes a shutter button 220 of a camera 200 to take a first image and stores the first image as shown on a screen 210, and a link information zone 260 is displayed. If the user selects the link information zone 260 using the button 230, the camera 200 may switch to an imaging mode and take a second image by pushing the shutter button 220. The second image may be added as link information of the first image.

The camera 200 may recognize characters within the second image by performing a character recognition process on the second image, and the camera 200 may convert the characters to text information and add the text information to the link information of the first image. For example, the text information may include the person's name, a relationship with the user of the image file managing apparatus, and the like. The camera 200 may add at least one of the second image file itself, a compressed second image file, and a storage address of the second image, to the link information of the first image.

Alternatively, if the user selects the link information zone 260 using the button 230 and switches to the playback mode using the button 230, the image file managing apparatus may display image files stored in the storage. If the user selects one of the image files being displayed, the camera 200 may determine the selected image file as the second image. At least one of the second image and the information about the second image may be added to the link information of the first image.

Figure 6:
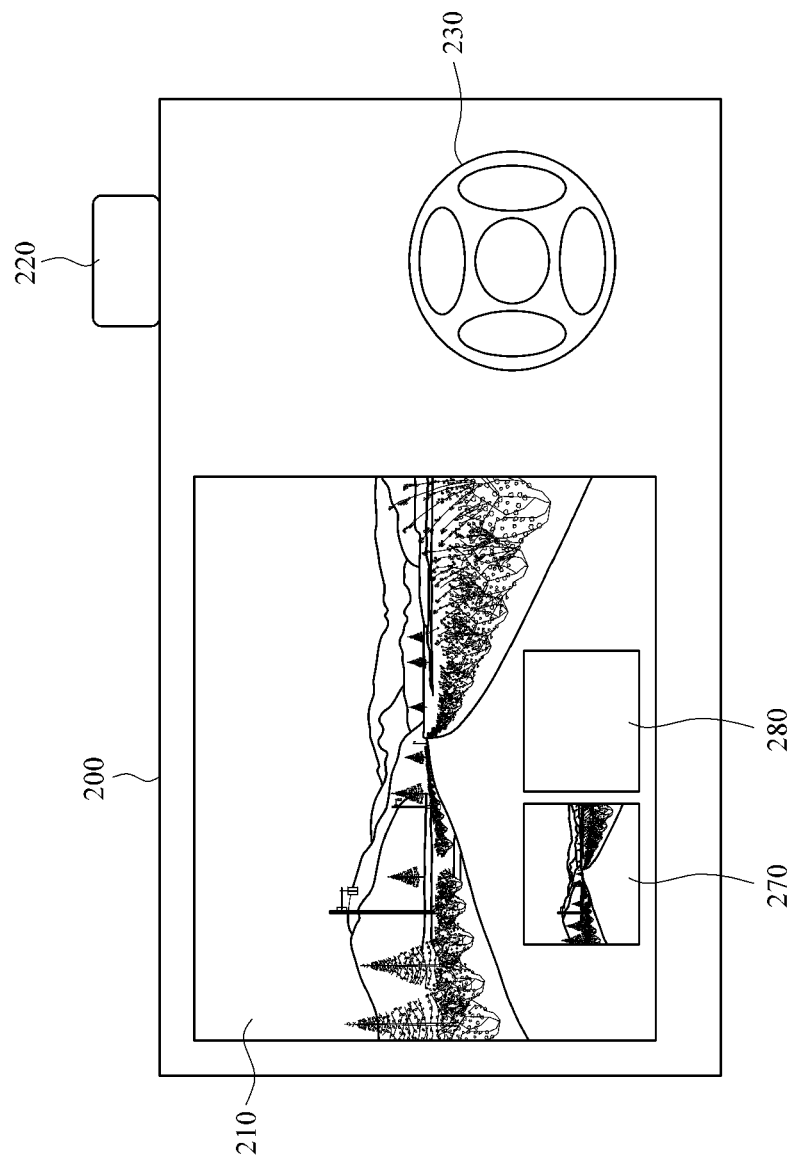
FIG. 6 is a diagram illustrating an example of inputting link information in the image file managing apparatus.

FIG. 6 illustrates an example of inputting link information in the image file managing apparatus.

A user may push the shutter button 220 of the camera 200 to capture and store a first image and display the first image as shown on a display 210. Also, a thumbnail 270 of the first image may be created and displayed on the display 210 and a link information zone 280 may also be displayed on the display 210. If the user selects the link information zone 280 using the button 230, the camera 200 may acquire a second image and add it to the link information of the first image. If the second image is acquired, the camera 200 may display a thumbnail of the second image in the link information zone 280 to indicate that the second image has been added as the link information of the first image.

Figure 7:
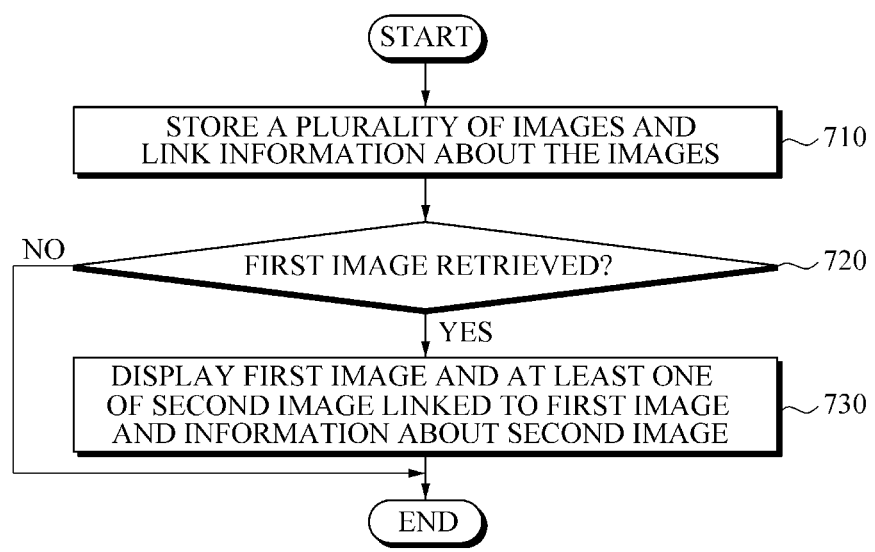
FIG. 7 is a flow chart illustrating an example of a method for managing image files.

FIG. 7 illustrates an example of a method for managing image files.

In 710, the image file managing apparatus 100 stores a plurality of images, and stores link information indicating linkage of each of the plurality images to the plurality of images. In 720, a user input signal for requesting retrieval of a first image is received. In 730, the image file managing apparatus uses the link information to retrieve the first image as well as at least one of a second image linked to the first image and information about the second image, and displays the retrieved result.

Figure 8:
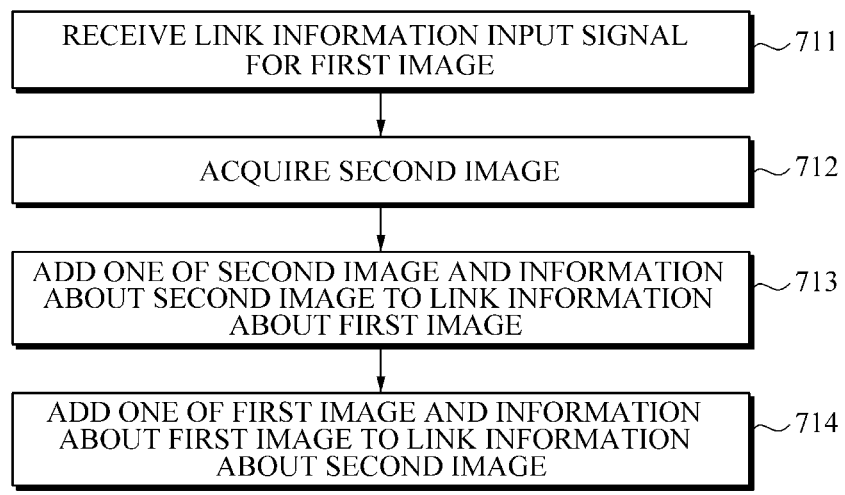
FIG. 8 is a flow chart illustrating an example of a method for generating link information.

FIG. 8 illustrates an example of a method for generating link information.

The method of generating link information shown in FIG. 8 may be performed before the link information is stored in 710 of FIG. 7. In 711, the image file managing apparatus receives a link information input signal for a first image. In 712, the image file managing apparatus acquires a second image. The image file managing apparatus may acquire the second image by capturing the second image or from stored image files.

In 713, the image file managing apparatus adds at least one of the second image and information about the second image to the link information about the first image. In 714, the image file managing apparatus adds at least one of the first image and information about the first image to the link information about the second image. 713 and 714 may be performed either in parallel or sequentially. The generated link information may be stored such that the link information may be retrieved when its corresponding image is retrieved and may be provided to a user. Accordingly, if a stored image file includes link information, the user may be provided with the stored image file as well as the link information about the stored image file.

Figure 9:
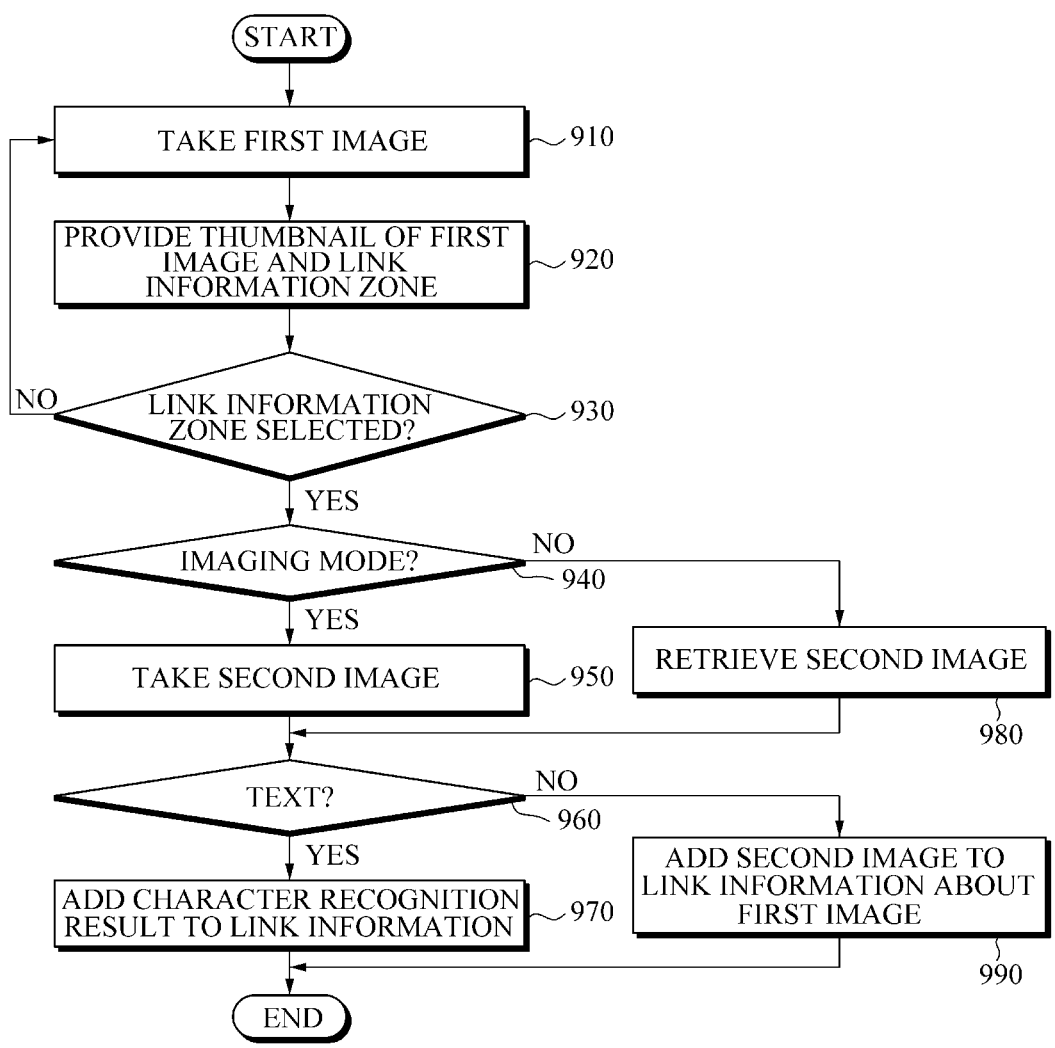
FIG. 9 is a flow chart illustrating an example of a method for storing image files.

FIG. 9 illustrates an example for storing image files.

In 910, the image file managing apparatus captures a first image. In 920, the image file managing apparatus provides a thumbnail of the first image to indicate that the first image has been stored, and provides a link information zone to indicate that the link information about the first image may be entered. In 930, if a user input signal is input to select the link information zone, the image file managing apparatus may determine that the user input signal is a link information input signal.

In 940, the user switches the image file managing apparatus to the imaging mode, and in 950 the image file managing apparatus takes a second image according to the user input signal.

In 960, the image file managing apparatus may recognize text within the second image by performing a character recognition process on the second image, and in 970 the image file managing apparatus may add the text to the link information of the first image. Also, the image file managing apparatus adds the second image to the link information of the first image in 990. For example, the image file managing apparatus may add a compressed second image or a storage address of the second image to the link information of the first image.

In 980, the user switches the image file managing apparatus to the playback mode and selects a second image from among stored image files. If the image file managing apparatus recognizes text within the second image by performing a character recognition process on the second image in 960, the image file managing apparatus may add the text to the link information of the first image in 970. Also, the image file managing apparatus may add the second image to the link information of the first image in 990.

As apparent from the above description, although a user does not input text in the image file managing apparatus, the user may include his or her desired link information in an image file when the user takes a image. Further, because the user may easily find information about the image using the link information of the image file, the user may efficiently retrieve the image files.

The image managing apparatus and methods described herein use link information to link images together. The link information may be generated automatically by the apparatus, or the link information may be input by a user. The apparatus may perform character recognition on images taken and images stored to identify one or more characters in the image. The apparatus may generate text, such as the character's name, and include the text with the image, when the image is displayed. When a user desires to view a first image, the apparatus and method may display one or more other images, or link information of one or more other images, as well as the first image itself. By linking images together, the apparatus provides a user of a terminal with a more efficient manner to view images stored in the terminal because images may be linked based on similarity.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, a terminal or a terminal device described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image file managing apparatus, comprising:
an imager configured to take a first image;
a display;
a storage configured to store the first image; and
a controller configured to:
control the display to display the first image and a link information zone that indicates link information of the first image; and
in response to a user selecting the link information zone:
acquire a second image;
add the second image and information about the about the second image to the link information of the first image;
in response to a character being recognized within the second image by performing a character recognition process on the second image, convert the recognized character into text information and add the text information to the link information of the first image; and
control the display to display the first image and the link information zone displaying the link information of the first image.

2. The image file managing apparatus of claim 1, wherein the controller is configured to control the imager to take the second image.

3. The image file managing apparatus of claim 1, wherein the controller is configured to acquire the second image from image files stored in the storage.

4. The image file managing apparatus of claim 1, wherein the information about the second image comprises at least one of a compressed file of the second image and a storage address of the second image.

5. The image file managing apparatus of claim 1, wherein in response to the link information of the first image comprising a linked image, the display is configured to display a thumbnail of the linked image, and in response to the link information of the stored image comprising text information, the display is configured to display the text information.

6. The image filing managing apparatus of claim 1, wherein the controller is configured to perform a person recognition process on the second image, generate a text description about a recognized person that is included within the second image, and add the text description about the recognized person to the link information of the first image.

7. The image filing managing apparatus of claim 1, wherein the information about the second image that is added to the link information of the first image links the first and second images such that, in response to the first image being selected, the first and second images are manageable simultaneously corresponding to files located in a same folder on a computer.

8. A method for managing an image file, the method comprising:
displaying a first image and a link information zone that indicates link information of the first image; and
in response to a user selecting the link information zone:
acquiring a second image using a controller;
adding, using the controller, the second image and information about the about the second image to the link information of the first image;
in response to a character being recognized in the second image by performing,
using the controller, a character recognition process on the second image:
converting, using the controller, the recognized character into text information, and
adding, using the controller, the text information to the link information of the first image;
displaying the first image and the link information zone displaying the link information of the first image.

9. The method of claim 8, wherein the acquiring the second image comprises switching to an imaging mode to acquire the second image.

10. The method of claim 8, wherein the acquiring the second image comprises acquiring the second image from stored image files.

11. The method of claim 8, further comprising displaying a stored image,
wherein in response to the stored image including link information of the stored image, the stored image and the link information of the stored image are displayed.

12. The method of claim 8, comprising
performing, using the controller, a person recognition process on the second image;
generating, using the controller, a text description about a recognized person that is included within the second image; and
adding, using the controller, the text description about the recognized person to the link information of the first image.

13. The method of claim 8, wherein the information about the second image that is added to the link information of the first image links the first and second images such that, in response to the first image being selected, the first and second images are manageable simultaneously corresponding to files located in a same folder on a computer.

\* \* \* \* \*